Dec. 15, 1942.  C. D. BURRELL  2,305,405
CLAMPING MEANS FOR GLASS RACKS
Filed Aug. 7, 1940  2 Sheets-Sheet 1

Inventor
CHARLES D. BURRELL
By Frank Fraser
Attorney

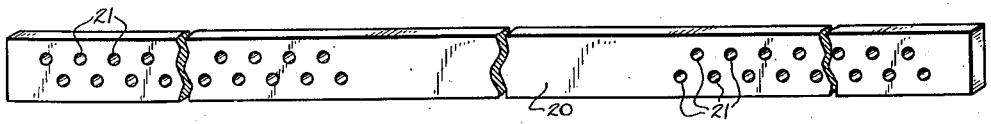
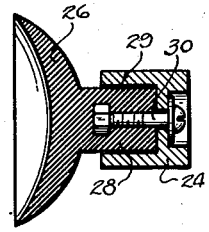
Fig. 5.
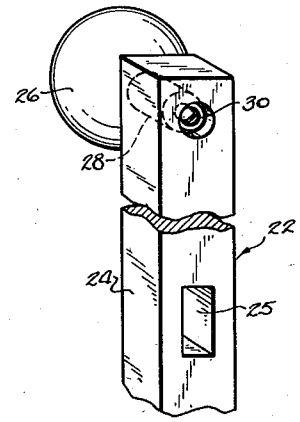
Fig. 4.
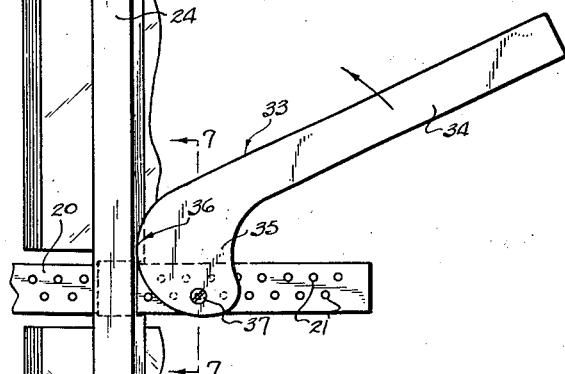
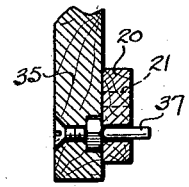
Fig. 7.
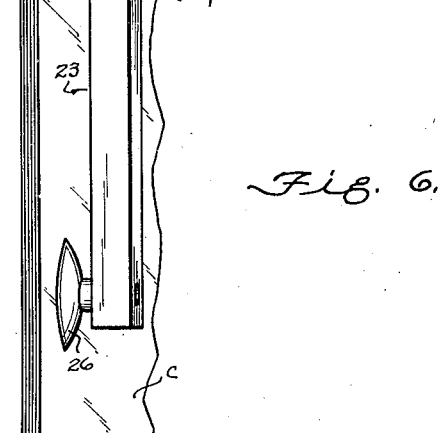
Fig. 6.
Inventor
CHARLES D. BURRELL.
By Frank Fraser
Attorney Patented Dec. 15, 1942

2,305,405

UNITED STATES PATENT OFFICE 2,305,405

CLAMPING MEANS FOR GLASS RACKS

Charles D. Burrell, Toledo, Ohio, assignor to Libbey-Owens-Ford Glass Company, Toledo, Ohio, a corporation of Ohio Application August 7, 1940, Serial No. 351,758

10 Claims. (Cl. 214—10.5)

The present invention relates to improvements in means for retaining sheets of glass in a substantially vertical position upon a rack of conventional design.

More particularly, this invention is concerned with the provision of novel clamping means for securing a plurality of stacks of glass sheets arranged side by side and one upon the other in a substantially vertical position upon the type of rack commonly referred to in the art as an "A" buck.

Another object of the invention is the provision of clamping means for securing the glass sheets upon the rack in a firm, positive manner to prevent movement of the sheets on the rack during its transfer from one location to another whereby liability of the glass becoming dislodged or broken during such transfer will be obviated.

Another object of the invention is the provision of clamping means of simple, inexpensive construction which may be easily and quickly associated with the glass sheets and removed therefrom; which requires no alteration of the rack; and which results in no multilation of the rack during the installation and removal thereof.

Other objects and advantages of the invention will become more apparent during the course of the following description when taken in connection with the accompanying drawings.

In the drawings wherein like numerals are employed to designate like parts throughout the same:

Fig. 3 is a perspective view of a portion of the clamping means;

Fig. 4 is a perspective view of another portion of the clamping means;

Fig. 5 is a detail sectional view of one of the glass engaging vacuum cups;

Fig. 6 is a plan view of a portion of the clamping means illustrating the manner of installation thereof; and Fig. 7 is a detail sectional view taken substantially on line 7—7 of Fig. 6.

Figure 1:
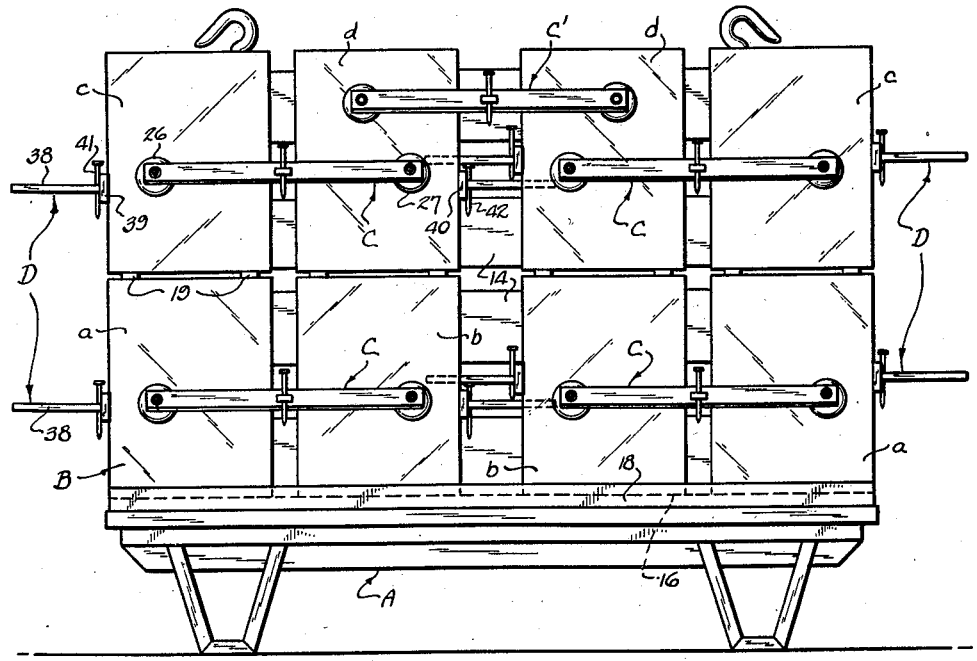
Fig. 1 is a side elevation of a glass rack supporting a plurality of stacks of glass sheets secured in place by the improved clamping means herein provided.
Figure 2:
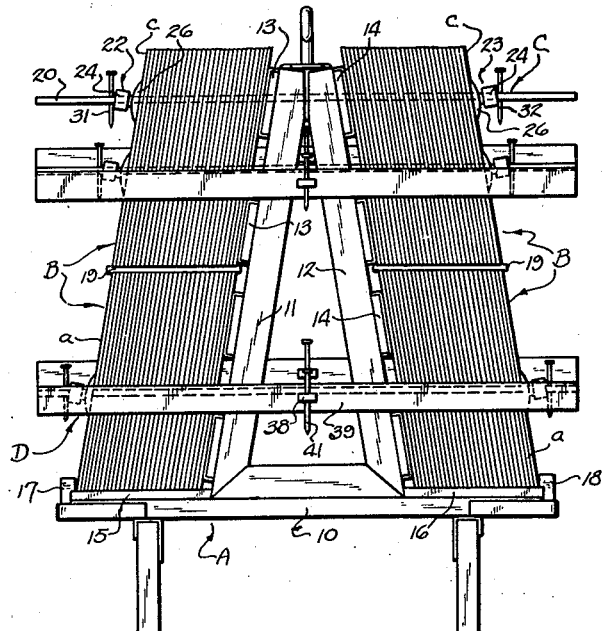
Fig. 2 is an end view thereof.

With reference now to the drawings, there is provided a rack A for supporting a plurality of stacks of glass sheets B which are secured upon the rack by the improved clamping means herein provided. Such clamping means includes the clamping devices C and D, the clamping devices C engaging the front faces of the stacks of sheets and being provided to prevent the glass sheets from falling forwardly off of the rack while the clamping devices D engage the outer edges of the stacks of sheets and prevent longitudinal movement of the glass upon said rack. The rack A is of a conventional type commonly referred to as an "A" buck, comprising a base 10 on which are mounted the inclined uprights 11 and 12 carrying horizontal transverse strips 13 and 14 respectively. Mounted upon the base 10, outwardly of inclined uprights 11 and 12, are the supporting boards 15 and 16 for supporting the stacks of glass sheets B and along the outer edges of which are secured the longitudinal stop strips 17 and 18 respectively.

It will be noted that the stacks of glass sheets B at each side of the rack are shown as being arranged in two groups, each group including four stacks of sheets, two stacks a and b being arranged side by side and upon which are supported the two stacks c and d respectively. The stacks of sheets a and b are supported at their lower edges upon the respective supporting board 15 or 16 and prevented from moving forwardly by the stop strip 17 or 18. Placed upon the upper edges of the stacks of sheets a and b are transverse spacer strips 19 upon which the stacks of sheets c and d are supported. The several stacks of glass sheets rest against the inclined side faces of the rack and are ordinarily in no danger of being displaced as long as the rack remains stationary. When it is removed from place to place, however, such as by means of a truck or an overhead crane, it becomes necessary to provide means for holding each stack of sheets in position, and the present invention is designed to effectually meet this requirement.

Each clamping device C comprises a supporting bar 20 illustrated in Fig. 3 and provided at each end thereof with a series of openings 21 staggered with respect to one another. The bar 20 is adapted to be inserted transversely between two horizontally adjacent stacks of glass sheets and to project beyond the stacks of sheets upon opposite sides of the buck. Associated with the opposite ends of the bar 20 are holders indicated generally at 22 and 23, each comprising a horizontal strap 24 having a rectangular opening 25 therein intermediate its ends for receiving the corresponding end of supporting bar 20 therethrough. Carried at the opposite ends of each strap 24 are vacuum cups 26 and 27, each being provided with a shank 28 (Fig. 5) received within a recess 29 in the corresponding end of said strap and secured therein by suitable fastening means 30.

When installing the clamping device C, the supporting bar 20 is first passed transversely of the rack between two adjacent stacks of glass sheets approximately intermediate the upper and lower edges thereof, and the bar is of such length that it projects at its opposite ends beyond the rack at both sides thereof. There is then slipped upon one end of the bar 20 the holder 22 or 23 which is moved inwardly along said bar until the vacuum cups 26 and 27 thereof engage the outer faces of adjacent stacks of sheets. To then secure the holder in place, a pin 31 is inserted through one of the openings 21 in bar 20. The other holder is then slipped over the opposite end of bar 20 and moved inwardly until the vacuum cups 26 and 27 thereof engage the outer faces of the respective stacks of sheets at the opposite side of the rack, whereupon a pin 32 is passed through the opening 21 in bar 20 nearest the holder.

If desired, in order to draw the holders 22 and 23 toward one another to compress the vacuum cups 26 and 27 and thereby firmly clamp the glass sheets against movement upon the rack, a tool, such as shown at 33 in Fig. 6, may be employed. This tool comprises a handle 34 provided at one end with a head 35 having a curved cam face 36. Carried by the head 35 is a pin 37 adapted for selective engagement with the openings 21 in supporting bar 20. After one of the holders 22 or 23 has been secured in place and the other holder slipped onto bar 20, the pin 37 of tool 33 is engaged in one of the openings 21 in said bar 20 and upon swinging the tool in the direction indicated by the arrow in Fig. 6, the cam face 36 thereof engaging the strap 24 of the holder will force the same inwardly against the stacks of sheets and at the same time draw the bar 20 through opening 25 in said holder to bring the holder at the opposite side of the rack into firm clamping engagement with the stacks of sheets at said other side of the rack. While held in such position, a securing pin can be inserted through the opening 21 in bar 20 nearest the holder.

As shown in Fig. 1, one of the clamping devices C engages the stacks of sheets a and b upon opposite sides of the rack, while a second clamping device engages the stacks of sheets c and d at opposite sides of the rack. If desired, the two stacks of sheets d at opposite sides of the rack can also be tied together by a clamping device C' similar to clamping devices C. The invention is of course not restricted to the arranging of the stacks of sheets upon the rack in the particular manner illustrated in Fig. 1, nor to the particular rack construction shown. Likewise, the employment of the vacuum cups 26 and 27 is not essential, although their use is preferred as they provide for a better clamping action against the stacks of sheets.

The clamping devices D are provided to prevent longitudinal shifting movement of the stacks of sheets upon the rack, and one of these clamping devices is associated with the stacks of sheets a and b of each group and a second clamping device with the stacks c and d of each group. The clamping devices D are of substantially the same construction as clamping devices C with the exception that the vacuum cups are omitted. Thus, each clamping device D comprises a supporting bar 38 extending longitudinally of the rack between the stacks of sheets at opposite sides thereof and having associated with the opposite ends thereof transverse bars 39 and 40 which engage the outer edges of the two stacks of sheets a and b or c and d and are secured in place by vertical pins 41 and 42 passing through openings in bar 38.

From the above, it will be readily seen that after the glass sheets have been stacked upon the rack in the manner illustrated in Fig. 1, they can be maintained securely in place by application of the clamping devices C and D. Further, that the clamping devices can be easily and quickly associated with the stacks of sheets and just as conveniently removed when desired. The clamping devices are of simple, inexpensive construction and can be used with the conventional type of "A" buck without modification of the buck.

In the past, it has been customary to secure the stacks of sheets upon an "A" buck for transfer from one place to another by means of longitudinal and transverse wooden strips nailed to the buck. In other words, the transverse strips were nailed to the ends of the inclined uprights 11 and 12 and the longitudinal strips then nailed to the transverse strips. However, this procedure not only required considerable time and labor but, in addition, the ends of the inclined uprights became relatively quickly mutilated by the nail holes with the result that these portions of the buck required rather rapid replacement. This, of course, not only necessitated taking the buck out of service periodically but also resulted in increased expense in keeping the bucks in good serviceable condition. The improved clamping means herein provided can of course be used without in any way causing mutilation of the buck, thereby resulting in the saving of both the time and expense which was heretofore required in keeping the bucks in serviceable condition as well as obviating the necessity of removing the bucks from service periodically for purposes of repair.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A clamping device for securing two stacks of glass sheets supported side by side and in edge to edge relation in a substantially vertical position at each side of a glass rack, comprising a horizontal supporting bar extending transversely of the rack between the edges of the adjacent stacks of sheets, and a holder carried by said bar at each side of said rack and engaging the faces of the corresponding stacks of sheets.

2. A clamping device for securing two stacks of glass sheets supported side by side and in edge to edge relation in a substantially vertical position at each side of a glass rack, comprising a horizontal supporting bar extending transversely of the rack between the edges of the adjacent stacks of sheets, and a holder carried by said bar at each side of said rack and including vacuum cups engaging the faces of the correspoonding stacks of sheets.

3. A clamping device for securing two stacks of glass sheets supported side by side and in edge to edge relation in a substantially vertical position at each side of a glass rack, comprising a horizontal supporting bar extending transversely of the rack between the edges of the adjacent stacks of sheets, a holder slidably mounted upon each end of said bar and engaging the faces of the stacks of sheets at the corresponding side of said rack, and means for securing the holders upon the said bar.

4. A clamping device for securing two stacks of glass sheets supported side by side and in edge to edge relation in a substantially vertical position at each side of a glass rack, comprising a horizontal supporting bar extending transversely of the rack between the edges of the adjacent stacks of sheets, a holder slidably mounted upon each end of said bar and including vacuum cups engaging the faces of the stacks of sheets at the corresponding side of said rack, and means for securing the holders upon the said bar.

5. A clamping device for securing two stacks of glass sheets supported side by side and in edge to edge relation in a substantially vertical position at each side of a glass rack, comprising a holder arranged at each side of said rack and engaging the faces of the corresponding stacks of sheets, and means independent of said rack and extending transversely thereof between the edges of the adjacent stacks of sheets for connecting said holders together in clamping engagement with said stacks of sheets.

6. A clamping device for securing two stacks of glass sheets supported side by side and in edge to edge relation in a substantially vertical position at each side of a glass rack, comprising a holder arranged at each side of said rack including vacuum cups engaging the faces of the corresponding stacks of sheets, and means independent of said rack and extending transversely thereof between the edges of the adjacent stacks of sheets for connecting said holders together in clamping engagement with said stacks of sheets.

7. A clamping device for securing two stacks of glass sheets supported side by side and in edge to edge relation in a substantially vertical position at each side of a glass rack, comprising a holder arranged at each side of said rack and engaging the faces of the corresponding stacks of sheets, means independent of said rack and extending transversely thereof between the edges of the adjacent stacks of sheets for supporting said holders and upon which said holders are slidably mounted, and means for securing the said holders upon said supporting means in clamping engagement with the stacks of sheets.

8. A clamping device for securing two stacks of glass sheets supported side by side and in edge to edge relation in a substantially vertical position at each side of a glass rack, comprising a holder arranged at each side of said rack and including vacuum cups engaging the the faces of the corresponding stacks of sheets, means independent of said rack and extending transversely thereof between the edges of the adjacent stacks of sheets for supporting said holders and upon which said holders are slidably mounted, and means for securing the said holders upon said supporting means in clamping engagement with the stacks of sheets.

9. A clamping device for securing two stacks of glass sheets supported side by side in a substantially vertical position at each side of a glass rack, comprising a supporting bar independent of the rack extending longitudinally thereof between the stacks of sheets at opposite sides thereof, and means also independent of said rack carried at the opposite ends of said bar and engaging the corresponding edges of the stacks of sheets.

10. A clamping device for securing two stacks of glass sheets supported side by side in a substantially vertical position at each side of a glass rack, comprising a supporting bar independent of the rack extending longitudinally thereof between the stacks of sheets at opposite sides thereof, transverse bars also independent of said rack slidably mounted upon the opposite ends of said supporting bar and engaging the corresponding edges of the stacks of sheets, and means for securing said transverse bars upon said supporting bar.

CHARLES D. BURRELL.